(12) United States Patent
Brattberg (10) Patent No.: US 7,742,863 B2
(45) Date of Patent: Jun. 22, 2010

(54) METHOD AND DEVICE FOR CONTROLLING A WORK FUNCTION OF A VEHICLE AND A WORK VEHICLE COMPRISING THE CONTROL DEVICE

(75) Inventor: Bjorn Brattberg, Eskilstuna (SE)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 197 days.

(21) Appl. No.: 11/308,291

(22) Filed: Mar. 15, 2006

(65) Prior Publication Data

US 2006/0200293 A1 Sep. 7, 2006

Related U.S. Application Data

(63) Continuation of application No. PCT/SE2004/001361, filed on Sep. 21, 2004.

(30) Foreign Application Priority Data

Sep. 23, 2003 (SE) .................................... 0302519

(51) Int. Cl.
*G06F 7/00* (2006.01)
*G06F 17/00* (2006.01)

(52) U.S. Cl. .............................. 701/51; 701/52; 701/55; 701/58; 701/50

(58) Field of Classification Search ................... 701/36, 701/40, 42, 43, 51, 58, 60, 61, 65, 50
See application file for complete search history.

(56) References Cited

U.S. PATENT DOCUMENTS 4,713,988 A * 12/1987 Harada et al. ............... 477/125

| | | | |
|---|---|---|---|
| 5,231,582 A | | 7/1993 | Takahashi et al. |
| 5,390,117 A | * | 2/1995 | Graf et al. ..................... 701/57 |
| 5,620,393 A | | 4/1997 | Minowa et al. |

(Continued)

FOREIGN PATENT DOCUMENTS

DE 4130265 3/1993

(Continued)

OTHER PUBLICATIONS

International Search Report for corresponding application. PCT/SE2004/001361.

*Primary Examiner*—Khoi Tran
*Assistant Examiner*—Bhavesh V Amin
(74) *Attorney, Agent, or Firm*—WRB-IP LLP (57) ABSTRACT

A method for controlling the gears of a vehicle that has an automatic transmission that is arranged to change gear according to a plurality of gear modes that differ in that changing to a higher gear is carried out at different minimum engine speeds or, if the changing is carried out steplessly, with different degrees of gearing, with the transmission having a forward gear position for driving the vehicle forwards and a reverse gear position for driving the vehicle backwards, comprising detection of an operating parameter and, in response to this production of a parameter signal for a control unit, selection, that is carried out by the control unit, of one of the gear modes on the basis of the parameter signal's value. The parameter signal represents the total distance that the vehicle has been driven during an individual sequence with at least one of the forward gear position and the reverse gear position.

23 Claims, 5 Drawing Sheets

U.S. PATENT DOCUMENTS

| | | | |
|---|---|---|---|
| 5,709,629 A * | 1/1998 | Minowa et al. | 477/120 |
| 5,832,400 A * | 11/1998 | Takahashi et al. | 701/53 |
| 6,085,137 A * | 7/2000 | Aruga et al. | 701/51 |
| 6,098,005 A * | 8/2000 | Tsukamoto et al. | 701/65 |
| 6,253,139 B1 * | 6/2001 | Borodani et al. | 701/55 |
| 6,292,736 B1 * | 9/2001 | Aruga et al. | 701/95 |

FOREIGN PATENT DOCUMENTS

| | | |
|---|---|---|
| DE | 4405093 | 8/1994 |
| EP | 1120588 | 8/2001 |

* cited by examiner

METHOD AND DEVICE FOR CONTROLLING A WORK FUNCTION OF A VEHICLE AND A WORK VEHICLE COMPRISING THE CONTROL DEVICE

The present application is a continuation of International Application No. PCT/SE2004/001361, filed Sep. 21, 2004, which claims priority to SE 0302519-4, filed Sep. 23, 2005, both of which are hereby incorporated by reference.

BACKGROUND AND SUMMARY

The present invention relates to a method for controlling a work function of a vehicle that has a forward gear position for driving the vehicle forwards and a reverse gear position for driving the vehicle backwards, comprising detection of an operating parameter and, in response to this, production of a parameter signal for a control unit, and control of the work function that is carried out by the control unit on the basis of the value of the parameter signals.

The invention also relates to a device for carrying out the method according to the invention and a work vehicle comprising the control device.

The work function can, for example, be the control response, that is to say the turning of the wheels in the case of turning of the steering wheel, or the hydraulic working pressure of a machine that works by hydraulics. The invention is, however, particularly suitable for controlling the selection of the gear mode of a work vehicle, such as a wheel loader, with automatic transmission with several gear modes. For the purpose of exemplification, it will be described with reference to such an application. The invention can, of course, also be applied to other types of work vehicle, such as a backhoe or a so-called skid steer vehicle.

Modern wheel loaders with automatic gearboxes currently use various so-called gear modes or gear functions according to a particular gear-change strategy. The gear modes differ in that changing to a higher gear, changing up, is carried out at different minimum engine speeds for the different gear modes, for changing between corresponding gears, and changing to a lower gear is carried out at different minimum vehicle speeds. In conventional wheel loaders, these modes are selected manually by an operator using a control, a so-called APS-control. Through EP 0 715102, a method is already known for controlling gear modes in an automatic vehicle transmission on the basis of parameter signals that represent operating conditions for the vehicle, the driver's driving intention, and the road conditions. In particular, the operating parameters represent the gradient of a road on which the vehicle is being driven. It is, however, normal for a vehicle of the wheel loader type, on which automatic transmissions of the type mentioned are usually found, to work on an essentially level surface. Even in such cases, there is a desire, depending upon the operation of the vehicle, to be able to select a gear mode that is the most expedient with regard to efficiency, fuel consumption, environmental factors, etc.

It is desirable to provide a method of the type mentioned in the introduction that provides important information for controlling a work function, preferably selection of gear mode, and that carries out controlling of the work function, or selection of gear mode, on the basis of the information.

According to an aspect of the present invention, a method for controlling a work function of a vehicle that has a forward gear position for driving the vehicle forwards and a reverse gear position for driving the vehicle backwards, comprises detection of an operating parameter and, in response to this, production of a parameter signal for a control unit, and control of the work function that is carried out by the control unit on the basis of the value of the parameter signals. The parameter signal represents the total distance that the vehicle is driven in an individual sequence with at least one of the forward gear position and the reverse gear position. In other words, the distance driven between two changes of direction of the vehicle is recorded, and the automatic control of the work function is based on the outcome of the recording. An individual recording of a distance driven is commenced at the moment there is a change of gear from forward gear position to reverse gear position or vice versa. The recording of the distance is terminated when the next change of gear back to the forward gear position or the reverse gear position is carried out. These changes between forward gear position and reverse gear position are assumed to be carried out manually by the driver of the vehicle. It is quite possible only to record the distance driven forwards or only to record the distance driven backwards, but it is preferable for the distance to be recorded in both directions. By measuring distances driven in this way and basing the control of any work function, for example the selection of gear mode, on these, it is possible to adapt the control of the work function in question to the load cycle according to which the vehicle is currently assumed to be working.

According to an aspect of the invention, the vehicle has an automatic transmission that is arranged to change gear according to a plurality of gear modes, with the gear mode being selected on the basis of the parameter signal. The gear modes differ in that changing to a higher gear is carried out at different minimum engine speeds.

According to an aspect of the invention, the method comprises generation of a parameter signal from each of a plurality of consecutive sequences and comparison of the parameter signals and control of the work function or selection of gear mode on the basis of the parameter signal that represents the longest distance driven. For each gear mode, there is a thus a range of distances for which precisely that gear mode is selected. Which gear mode is selected or how a particular work function is controlled thus depends upon the range in which the longest measured distance is to be found.

Suitably, only a certain maximal number of parameter signals or recordings of previous distances driven are recorded for comparison in the control unit.

At the commencement of the vehicle being driven, the control unit preferably selects automatically a highest gear mode, that changes to a higher gear at a lower minimum engine speed than other gear modes. As soon as a first parameter signal has been obtained, a review of the selection of gear mode is carried out. This principle is, moreover, generally applicable for controlling other work functions than the selection of gear mode.

In a device according to an aspect of the invention, the operating parameter represents the distance the vehicle has been driven in an individual sequence with at least one of the forward gear position and the reverse gear position.

A vehicle according to an aspect of the invention has an automatic transmission that is arranged to change gear according to a plurality of gear modes, with the control unit being arranged to select the gear mode on the basis of the parameter signal.

The gear modes differ in that corresponding changes to a higher gear take place at different minimum engine speeds.

In order to make possible an automatic implementation of a preferred embodiment of the method according to the invention, the control unit is advantageously arranged to collect from the sensor a parameter signal from each of a plurality of consecutive sequences and the control unit is arranged to compare the parameter signals and to control the work function or select the gear mode on the basis of the parameter signal that represents the longest distance driven.

In addition, the control unit is preferably arranged, when driving of the vehicle commences, to select the highest gear mode that changes to a higher gear at the lowest minimum engine speed of all the gear modes.

In addition, the sensor should be arranged, during an ongoing sequence with the transmission in the forward gear position or reverse gear position, to send a signal continually to the control unit concerning the distance traveled, and the control unit should be arranged, when the parameter signal represents a distance that exceeds the greatest distance that is represented by the parameter signals for the immediately preceding sequences, to change to the next higher gear mode. This means that change of gear mode can take place even before a finally-complete distance in a gear position has been measured. It can suffice, during an ongoing measurement, for the distance to exceed the longest distance measured so far or a predetermined value, in order for an immediate change to a higher gear mode to be required by the control unit.

Additional characteristics and advantages of the present invention will be apparent from the following description.

BRIEF DESCRIPTION OF THE DRAWINGS

The invention will be described in greater detail for the purpose of exemplification, with reference to the attached drawings, in which.

DETAILED DESCRIPTION

Figure 1:
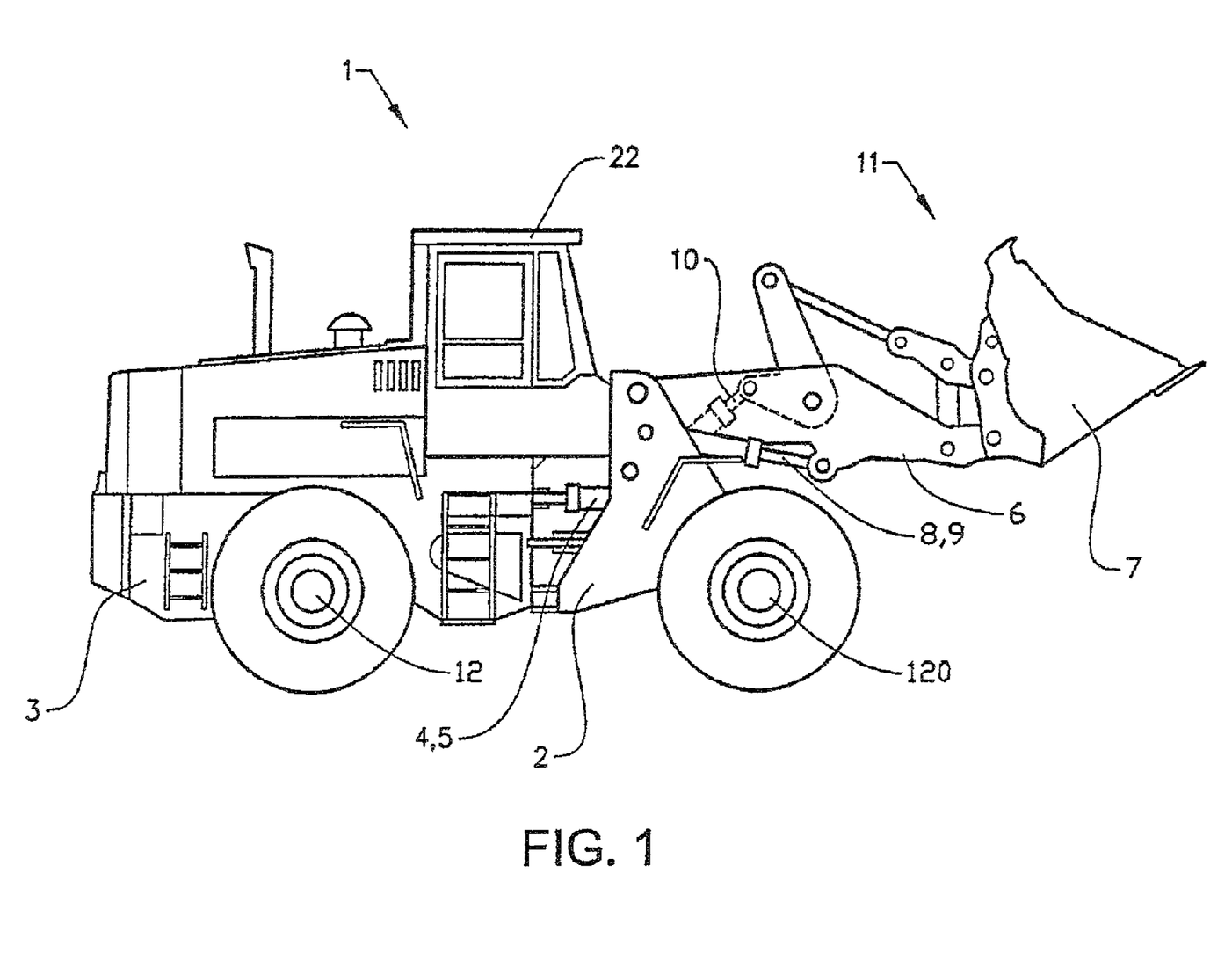
FIG. 1 shows schematically in a side view, a work vehicle in the form of a wheel loader.

FIG. 1 shows a work vehicle in the form of a wheel loader 1. The wheel loader 1 comprises a front 2 and a rear part 3 of the vehicle. The rear part 3 of the vehicle comprises a cab 22 and the vehicle's driving engine (not shown). The wheel loader 1 comprises, in addition, a loading arm unit 6 and a tool 7, here in the form of a bucket, arranged on the loading arm unit for handling objects and materials. At a first end, the loading arm unit 6 is connected to the first part 2 of the vehicle in such a way that it can move. At the other end of the loading arm unit 6, the tool 7 is connected to the unit in such a way that it can move. Each of parts 2,3 of the vehicle has, in addition, a drive shaft 12,120. The parts 2,3 of the vehicle are connected to each other in such a way that they can move in relation to each other. The parts 2,3 of the vehicle can be rotated in relation to each other around an axis, by means of two first hydraulic components in form of hydraulic cylinders 4,5 arranged between the two parts. The hydraulic cylinders 4,5 are thus arranged to turn the wheel loader 1.

The loading arm unit 6 can be raised and lowered in relation to the front part 2 of the vehicle by means of two second hydraulic components in form of two hydraulic cylinders 8,9, each of which is attached at one end to the front part 2 of the vehicle and at its other end to the loading arm unit 6. The bucket 7 can be tilted in relation to the loading arm unit 6 by means of a third hydraulic component in form of a hydraulic cylinder 10, that is attached at one end to the front part 2 of the vehicle and at its other end to the bucket 7, via a link arm system that is also connected to the loading arm unit in such a way that it can pivot.

Figure 2:
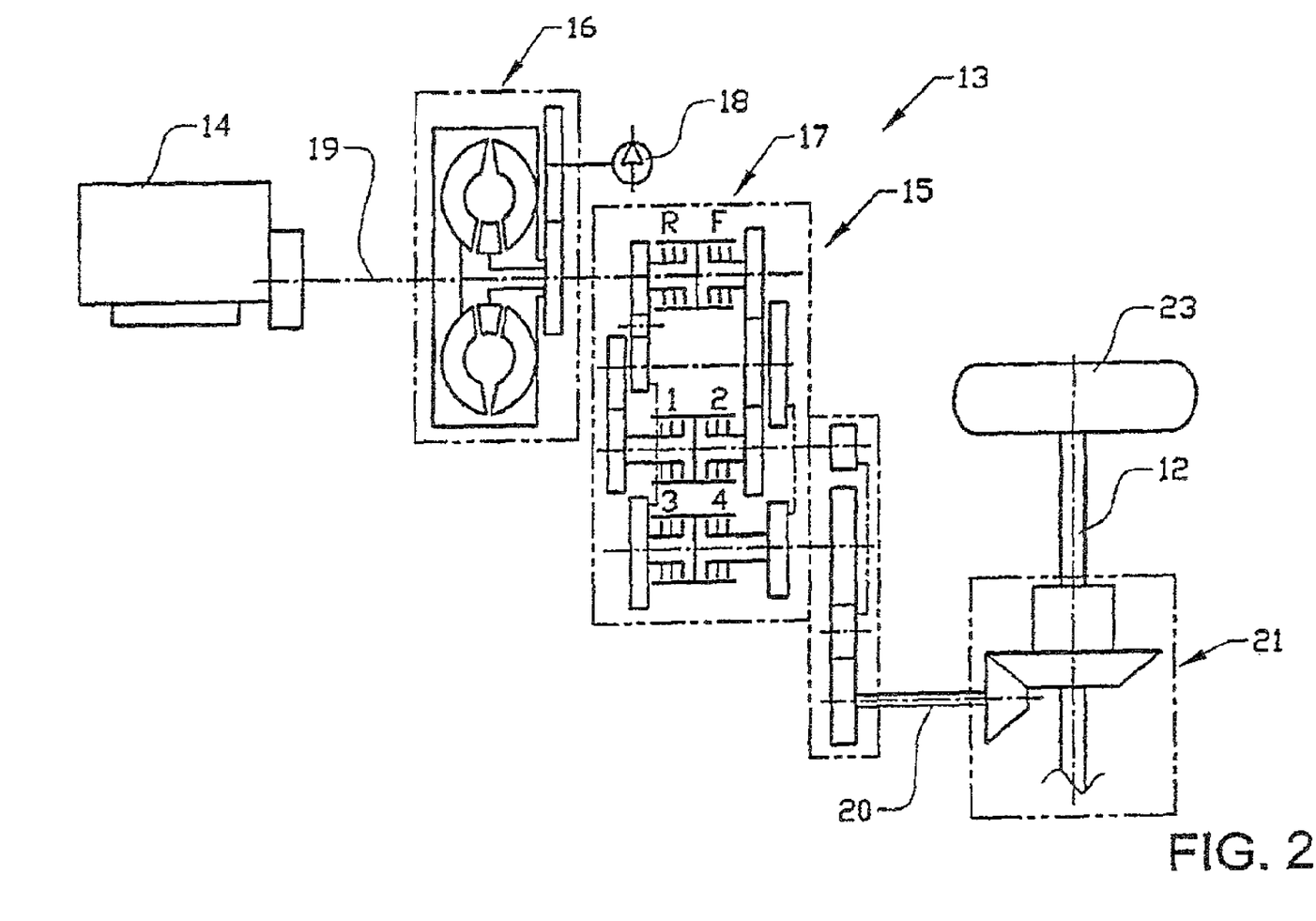
FIG. 2 shows schematically an embodiment of a drive line for the wheel loader.

FIG. 2 shows, in a simplified drawing, the drive line 13 of the wheel loader 1. The drive line 13 comprises a combustion engine 14 in the form of a diesel engine, an automatic gearbox 15 and a hydrodynamic torque converter 16.

The gearbox 15 consists of an electrically-controlled automatic gearbox of the "power-shift" type. The gearbox 15 comprises a forward and reverse gear 17.

The torque converter 16 is arranged between the engine 14 and the gearbox 15. An outgoing shaft 19 from the engine 14 thus drives the torque converter 16. An outgoing shaft 20 from the gearbox 15 is arranged to drive the rear drive shaft 12, on which the vehicle's driving wheels 23 are arranged, via a differential gear 21.

FIG. 2 also shows a pump 18 in the vehicle's hydraulic system that is arranged to provide the hydraulic cylinders 4,5, 8,9, 10 with hydraulic oil. The pump 18 is driven by the outgoing shaft 19 of the engine 14.

Figure 3:
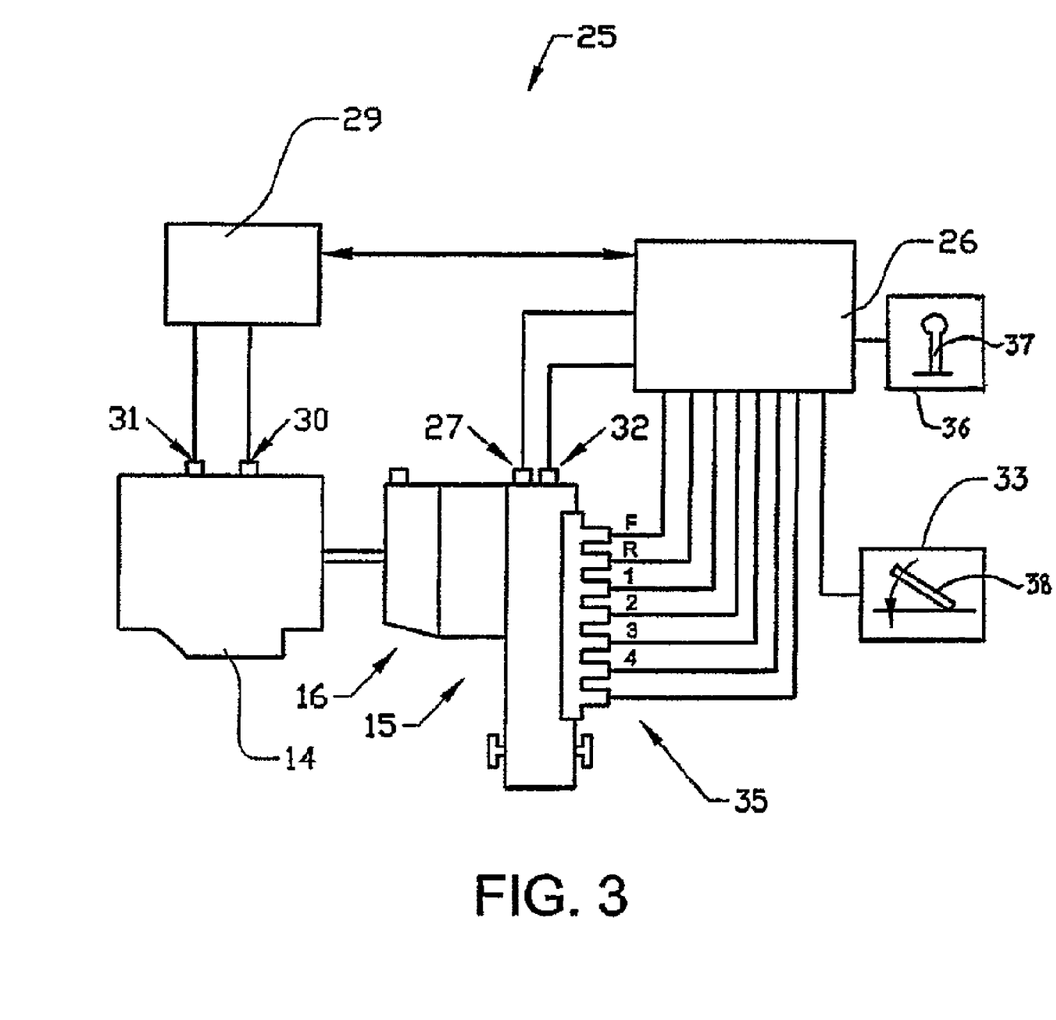
FIG. 3 shows schematically a device for controlling the engine and gearbox of the wheel loader.

FIG. 3 shows a device 25 for controlling the engine 14 and gearbox 15 of the wheel loader 1. The control device 25 comprises a first control unit 26 (or ECU; Electronic Control Unit) with software for controlling the wheel loader 1.

The control unit 26 comprises a processor and a memory. The control unit 26 is connected to the gearbox 15 for controlling pre-programmed gear modes in response to certain operating parameters. The control device 25 comprises a sensor 27 for detection of the selected forward or reverse gear in the gearbox 15. The sensor 27 is arranged to generate a signal with this information for the control unit 26. The control device 25 comprises, in addition, a sensor 32 for detection of the distance that the vehicle has traveled. The sensor 32 can consist of a magnetic pick-up device that detects the movement of a gear tooth in the gearbox, as the speed of rotation of the gear tooth corresponds to the speed of the engine. The sensor 32 is arranged to generate a signal with this information for the control unit 26. The control unit 26 receives signals from the sensors 27 and 32, selects a gear mode on the basis of this information and controls the gearbox 15 in accordance with the selected gear mode. The control device 25 comprises, in addition, a gear lever 37 that is operatively connected to the control unit 26. As an alternative to the sensor 27 being utilized for detection of the selected forward or reverse gear in the gearbox 15, a sensor 36 can be utilized that detects the position of the gear lever 37. The sensor 36 is arranged to generate a signal with this information for the control unit 26.

The control device 25 comprises a second control unit 29, see FIG. 3, for controlling the speed of the engine 14 via known control means 31, such as via a fuel pump. The second control unit 29 is functionally (electrically) connected to the first control unit 26 and receives information from this concerning the required speed of the engine. In this case, a sensor 33 detects the position of a throttle pedal 38 and generates a signal with information about the position of the throttle pedal for the first control unit 26.

The first control unit 26 thus informs the second control unit 29 about the required engine speed and the second control unit 29 controls the engine speed in a corresponding way. The engine speed is thus increased with increased depression of the throttle pedal.

The speed of the engine 14 is detected by a sensor 30. The sensor 30 is arranged to generate a signal with the engine speed information for the first control unit 26 (via the second control unit 29). The engine speed information is utilized for controlling the gear mode, which will be described in greater detail below.

The speed of the vehicle is also detected in a conventional way by the sensor 32. Information about the speed of the vehicle is utilized for controlling the gear mode, which will be described in greater detail below.

The control device 25 comprises a plurality of means 35 for controlling the gear modes of the gearbox 15. These control means 35 are arranged in the gearbox 15 for automatic changing between different gears and are arranged to receive control signals from the first control unit.

Figure 4:
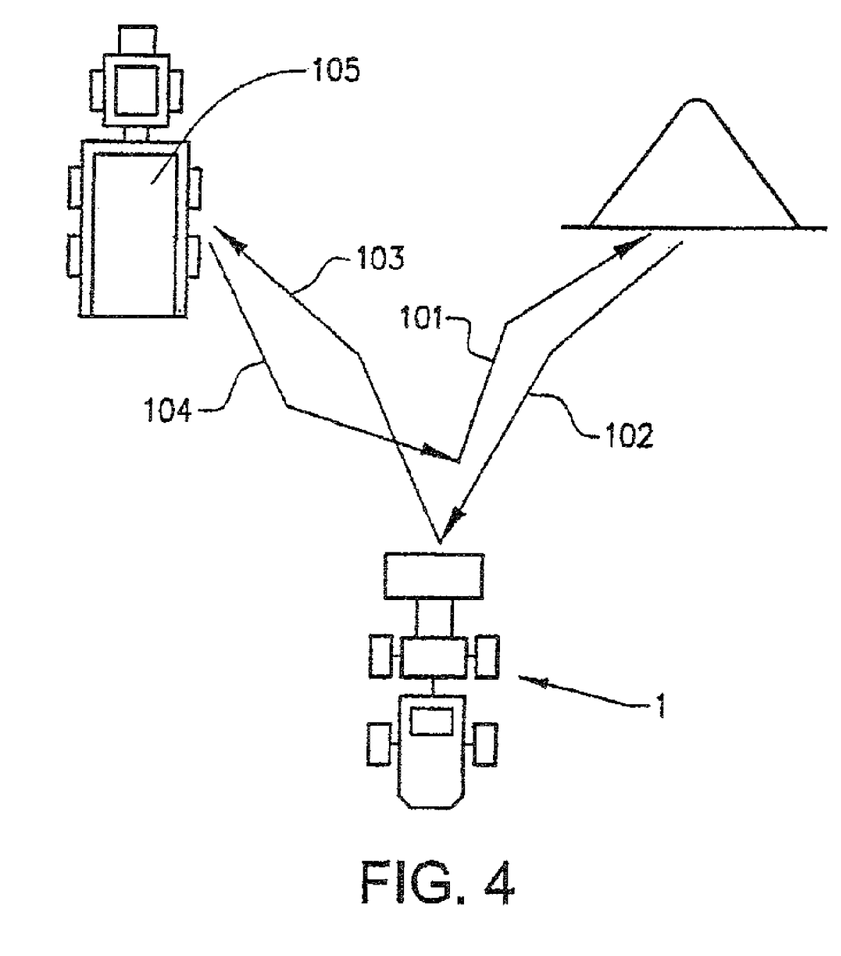
FIGS. 4 and 5 show examples of different load cycles for a work vehicle that is arranged in accordance with the invention.

With reference to FIG. 4, so-called short-cycle loading for the wheel loader 1 is shown, which wheel loader is equipped with automatic transmission 15 and with software for controlling, among other things, the selection of one of several pre-programmed gear modes on the basis of continuous operating parameter signals that are supplied from the sensors to the first control unit 26 in which the software is installed.

The short-cycle loading shown in FIG. 4 is characterized in that the longest distance that the vehicle travels forwards or backwards does not exceed a certain number of meters, in this case of the order of 15 meters.

Figure 5:
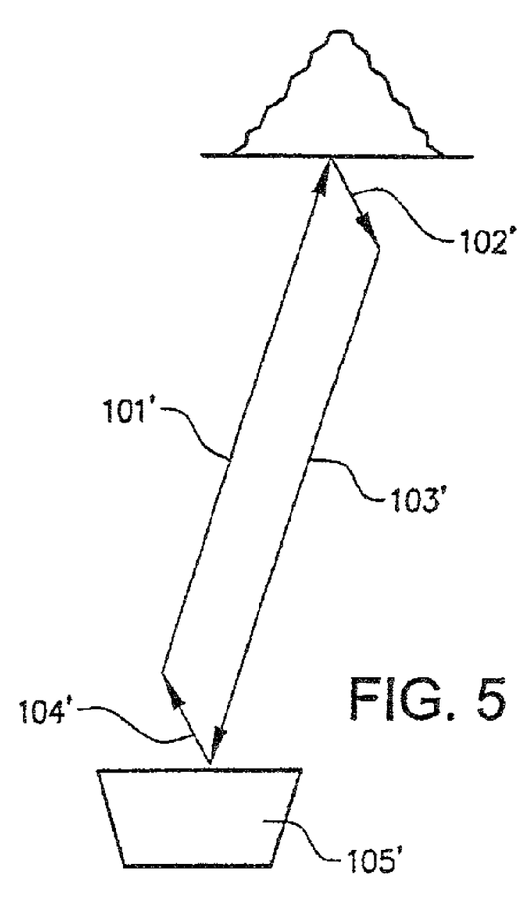

FIG. 5 shows another loading cycle, in which the longest distance that the vehicle travels forwards or backwards lies within a given range.

The reference numerals 101-104 and 101'-104' in FIGS. 4 and 5 respectively relate to load cycles of the wheel loader 1 in the form of four vehicle movements, namely forwards towards and interaction with the material (gravel or stone) that is intended to be moved 101, 101', backwards with the material in the bucket 102, 102', forwards again to the position (lorry 105 or stone crusher 105') where the material is intended to be placed 103, 103', and thereafter backwards 104, 104' to the initial position.

The software in the control unit 26 is arranged to select automatically the mode that at the time is best suited for the work cycle in question. In general, there are four types of work cycle: "transportation", "load carrying", "close handling", and "short-cycle loading". Of course, a more or less detailed division can also be carried out, but according to the invention this division is preferred, as it can be considered to be the best compromise at present between accuracy and the number of gear modes that it can be expedient to arrange for an automatic transmission for a vehicle of the type described.

The different cycles have preferably the following limit values:

| Cycle | longest distance | gear mode |
|---|---|---|
| 1 Transportation | >500 m | light 1 |
| 2 Load carrying | 75-500 m | light 2 |
| 3 Close handling | 15-75 m | normal |
| 4 Short-cycle loading | 0-15 m | heavy |

It is, however, recognized that completely different limit values can be used for the definition of the different cycles.

The different gear modes differ in that changing to the next higher gear is carried out at a relatively lower minimum engine speed, the longer the maximum distance that the vehicle is assumed to travel. This is shown more clearly in FIG. 6, in which the engine speed is shown in relation to the speed of the vehicle and in which an example of a gear schedule for changing between, for example, 2nd, 3rd and 4th gear is shown. For changing up from 3rd to 4th gear there is a lower changing-up line 111.

Figure 6:
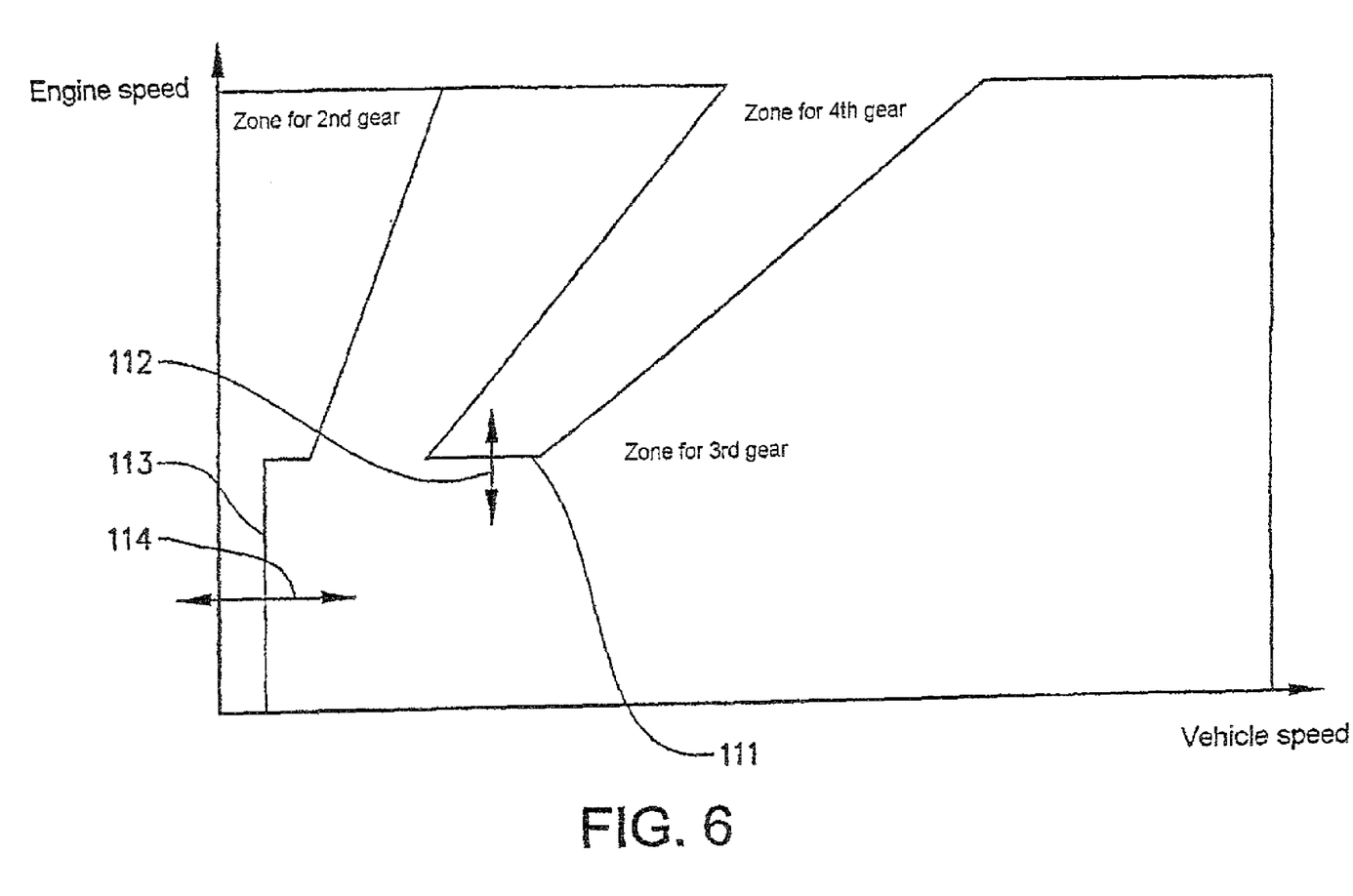
FIG. 6 shows a gear-change schedule where the engine speed is shown in relation to the speed of the vehicle and from which it is apparent when a change between two adjacent gears takes place and how the gear positions differ between different gear modes.

This changing-up line is different, is changed, for different gear modes, as shown by the arrow 112. It is moved, for example, towards a higher engine speed when short-cycle loading is identified and towards a lower engine speed when a transportation cycle has been identified. In other words, the higher the gear mode, the lower the changing-up line. In other words, the line shows the lowest engine speed for changing up to the next higher gear for the respective gear mode.

For cycle 1, that is to say "transportation", the gear mode "light 1" is activated, for which changing up is carried out earlier, that is to say at the lowest engine speed. For "short-cycle loading", the gear mode is activated for which changing up is carried out at the highest engine speed, that is to say the vehicle is driven in relatively low gears as it is not expected that the vehicle will need to change up a gear before the next change of direction is carried out.

In accordance with FIG. 6, the different gear modes also differ in that changing down to the next lower gear is carried out at different minimum speeds for the respective gear modes in association with reducing speed. FIG. 6 shows a changing-down line 113 for changing down from 3rd gear to 2nd gear. The line shows the lowest speed at which changing down is carried out. This changing-down line is different for different gear modes. It is displaced towards a higher vehicle speed when short-cycle loading is identified and is displaced towards a lower speed when a transportation cycle has been identified. In other words, the higher the gear mode, the lower the vehicle speed at which the line is located, as shown by the arrow 114. The higher the gear mode, starting from "light 1", that is activated for the working cycle "transportation", the later the changing down, that is to say, the lower the speed before changing down is carried out to the next lower gear.

The control unit's software has a memory for storing the parameter signals that represent the most recent distances driven. How many distances are stored and compared with each other determines the sensitivity of the control unit. A distance driven is defined as the distance driven between two changes of direction. A change of direction is a change from forward gear position to reverse gear position and vice versa. A change of direction is also carried out per definition when starting the vehicle, that is to say also when an initial change is carried out from neutral to any one of the forward or reverse gear positions.

By means of the invention, as a result of the control unit's continual selection of gear mode on the basis of the type of work cycle that is judged to be relevant at the time, the vehicle can adapt its gear-change strategy to the prevailing conditions and in this way can work more efficiently and/or with lower fuel consumption and/or with less environmental damage. For example, unnecessary changing-up is avoided in work cycles of the "short-cycle loading" type, which also contributes to smoother running of the vehicle.

The invention also relates to a computer program for carrying out the method steps as described above when the program is run on a computer.

The program is stored in the control unit's memory. The computer program could be sent to the control unit 26 via wireless means, for example via the Internet.

The invention also relates to a computer program product comprising software code stored on a medium that can be read by a computer in order to carry out the method steps when the program is run on a computer. The medium that can be read by a computer can be a floppy disc or a CD-ROM.

The abovementioned first control unit 26 (ECU) is often also called a CPU (Control Power Unit) or simply the on-board computer.

It is recognized that a plurality of alternative embodiments of the invention will be apparent to an expert within the field. The scope of the invention is not to be limited solely to the embodiment that is described here, but by what is defined in the attached patent claims, supported by the description and the attached drawings.

For example, it is reasonable to suppose that the selection of gear mode is not based solely on the measurement of distances between changes of direction, but also on the basis of other operating parameters, such as the gradient of the road, etc. Different combinations of operating parameters that form the basis for the selection of gear mode are therefore also covered by the invention.

It is also recognized that the signal that represents the operating parameter "distance driven" as described in the invention must not be but is preferably directly generated by a sensor for measuring distance. It is quite possible to measure completely different parameters, provided, however, that there is a correlation between these and the distance traveled, in order to select a gear mode, according to the principle described above, on the basis of these.

The type of gearbox shown in FIG. 2 is only to be regarded as an example of a gearbox that could be used with the invention.

The invention is not limited to controlling gear modes. It could also be possible to control the speed of the engine on the basis of the parameter signal values.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A method for controlling a work function of a vehicle having an automatic transmission that has a forward gear position for driving the vehicle forwards and a reverse gear position for driving the vehicle backwards, comprising:
    determining a distance that the vehicle has been driven during at least one sequence of a plurality of sequences after a first sequence of the plurality of sequences, the transmission being in one of the forward gear position or the reverse gear position for the at least one sequence of the plurality of sequences; and
    for the at least one sequence of the plurality of sequences, identifying a desired gear mode depending upon the distance that the vehicle has been driven during the at least one sequence of the plurality of sequences.

2. The method as claimed in claim 1, wherein the gear modes differ in that changing to a higher gear takes place at different minimum engine speeds.

3. The method as claimed in claim 1, comprising determining distances driven during each of a plurality of consecutive sequences, comparing the distances driven, and identifying a desired gear mode based on a longest distance driven.

4. The method as claimed in claim 1, comprising, upon commencement of driving the vehicle, arranging the control unit to select a highest gear mode, and changing to a higher gear at a lowest minimum engine speed of all the gear modes.

5. The method as claimed in claim 1, comprising continuously determining a distance driven during an ongoing sequence with the transmission in the forward gear position or the reverse gear position, and, when the distance driven exceeds a greatest distance for immediately preceding sequences, changing to a next higher gear mode.

6. The method as claimed in claim 1, wherein the gear modes differ in that changing down to a lower gear is carried out at different minimum speeds.

7. A computer readable medium comprising a computer program comprising software code for carrying out steps in a method for controlling a work function of a vehicle having an automatic transmission that has a forward gear position for driving the vehicle forwards and a reverse gear position for driving the vehicle backwards when the program is run on a computer, the program carrying out the steps of:
    determining a distance that the vehicle has been driven during at least one sequence of a plurality of sequences after a first sequence of the plurality of sequences, the transmission being in one of the forward gear position or the reverse gear position for the at least one sequence of the plurality of sequences; and
    for the at least one sequence of the plurality of sequences, identifying a desired gear mode depending upon the distance that the vehicle has been driven during the at least one sequence of the plurality of sequences.

8. A computer program product comprising the computer program comprising the software code as set forth in claim 7, the computer program product being stored on a medium that can be read by a computer.

9. A device for controlling a work function of a vehicle having an automatic transmission that has a forward gear position for driving the vehicle forwards and a reverse gear position for driving the vehicle backwards, comprising:
    a control arrangement including at least one sensor, the control arrangement being arranged to determine a distance that the vehicle has been driven during at least one sequence of a plurality of sequences after a first sequence of the plurality of sequences, the transmission being in one of the forward gear position or the reverse gear position for the at least one sequence of the plurality of sequences, and the control arrangement being arranged to change gear in the transmission according to a plurality of gear modes and, for the at least one sequence of the plurality of sequences, to identify a desired gear mode based on the distance that the vehicle has been driven during the at least one sequence of the plurality of sequences.

10. The device as claimed in claim 9, wherein the gear modes differ in that corresponding changes to a higher gear take place at different minimum engine speeds.

11. The device as claimed in claim 9, wherein the distance driven for an individual sequence is the distance driven for the individual sequence with the forward gear position or the distance driven for the individual sequence with the reverse gear position.

12. The device as claimed in claim 11, wherein the control unit is arranged to collect from the sensor a distance driven from each of a plurality of consecutive sequences and the control unit is arranged to compare the distances driven and identify the gear mode based on a longest distance driven.

13. The device as claimed in claim 9, wherein the control unit is arranged to identify a highest gear mode when driving of the vehicle commences, and to change to a higher gear at a lowest minimum engine speed of all of the gear modes.

14. The device as claimed in claim 9, wherein the sensor is arranged, during an ongoing sequence with the transmission in the forward gear position or the reverse gear position, to continually determine a distance driven, and the control unit is arranged, when the distance driven exceeds a largest distance for immediately preceding sequences, to change to a next higher gear mode.

15. The device as claimed in claim 9, wherein the gear modes differ in that changing down to a lower gear is carried out at different minimum speeds.

16. The device as claimed in claim 9, comprising a sensor for detecting a selected forward or reverse gear, the gear sensor being arranged to produce a parameter signal for the control unit with information concerning a selected gear.

17. A work vehicle comprising a device as claimed in claim 9.

18. The method as claimed in claim 1, comprising detecting a plurality of respective total distances that the vehicle is driven during respective individual sequences in one of each of the forward gear position and the reverse gear position, and controlling the gear mode based on a plurality of the detected total distances' values.

19. The device as claimed in claim 9, wherein the sensor is arranged to detect a plurality of respective total distances that the vehicle is driven during respective individual sequences in one of each of the forward gear position and the reverse gear position, and the control unit is arranged to control the gear mode based on values of a plurality of the plurality of total distances.

20. The method as set forth in claim 1, wherein the at least one sequence is a single sequence.

21. The method as set forth in 20, wherein the transmission is in the forward gear position during the single sequence.

22. The method as set forth in claim 1, wherein the at least one sequence comprises a sequence in which the transmission is in the forward gear position and a sequence in which the transmission is in the reverse gear position.

23. The method as set forth in claim 1, wherein the identified gear mode is selected during a sequence subsequent to the at least one sequence of the plurality of sequences.

* * * * *